(12) United States Patent
Yoshida

(10) Patent No.: US 6,202,337 B1
(45) Date of Patent: Mar. 20, 2001

(54) LURE

(75) Inventor: Gentaro Yoshida, Kofu (JP)

(73) Assignee: Japan Artificial Bait Co., Ltd., Yamanashi (JP)

( * ) Notice: Subject to any disclaimer, the term of this patent is extended or adjusted under 35 U.S.C. 154(b) by 0 days.

(21) Appl. No.: 09/297,332

(22) PCT Filed: Sep. 12, 1997

(86) PCT No.: PCT/JP97/03243

§ 371 Date: Jun. 24, 1999

§ 102(e) Date: Jun. 24, 1999

(87) PCT Pub. No.: WO98/19524

PCT Pub. Date: May 14, 1998

(30) Foreign Application Priority Data

Nov. 1, 1996 (JP) .................................................. 8-011176 U (51) Int. Cl.$^7$ .................................................. A01K 85/00
(52) U.S. Cl. ........................ 43/42.31; 43/42.33; 43/42.44
(58) Field of Search .................. 43/42.44, 42.31, 43/42.32, 42.33, 42.35, 42.34

(56) References Cited

U.S. PATENT DOCUMENTS

| | | | | |
|---|---|---|---|---|
| 1,299,432 | * | 4/1919 | Dickens | 43/42.44 |
| 1,881,823 | * | 10/1932 | McKenzie | 43/42.33 |
| 2,570,404 | * | 10/1951 | Stirlen | 43/42.32 |
| 2,733,535 | * | 2/1956 | Rosen | 43/42.33 |
| 3,077,046 | * | 2/1963 | Murray | 43/17.6 |
| 3,423,868 | * | 1/1969 | Le Master | 43/42.33 |
| 3,494,065 | * | 2/1970 | Benttinen | 43/42.33 |
| 3,528,189 | * | 9/1970 | Lilley | 43/42.33 |
| 3,540,144 | * | 11/1970 | Gurka | 43/42.33 |
| 4,060,926 | * | 12/1977 | Cordell | 43/42.44 |
| 4,098,017 | * | 7/1978 | Hall | 43/42.31 |
| 4,283,876 | * | 8/1981 | Volenec | 43/42.33 |
| 4,700,504 | * | 10/1987 | Mattison | 43/42.33 |
| 4,803,793 | * | 2/1989 | Schellenberg | 43/42.33 |
| 5,036,617 | * | 8/1991 | Waldrip | 43/42.31 |
| 5,070,639 | * | 12/1991 | Pippert | 43/42.31 |
| 5,134,799 | * | 8/1992 | Trnka | 43/42.22 |
| 5,600,916 | * | 2/1997 | Smith | 43/42.47 |
| 5,737,867 | * | 4/1998 | Tsutsumi | 43/17.6 |

* cited by examiner

*Primary Examiner*—Kurt Rowan
(74) *Attorney, Agent, or Firm*—Wenderoth, Lind & Ponack, L.L.P.

(57) ABSTRACT

A lure is formed by pasting together a pair of identical complementary lure members comprising a transparent or translucent material in such a manner that the inner surfaces of the lure members are spaced from each other to form a hollow therebetween. A rattle booth formed separately from the lure members is fixed within the hollow defined by the complementary lure members, and a rattle is housed in this rattle booth. A retainer for a metal connecting member which extends in the lengthwise direction of the longitudinal joint of the complementary lure members may be provided on the same joint portions, and a leg portion of the metal connecting member fixed to the retainer on the complementary lure members extends in the lengthwise direction of the retainer. Accordingly, a rattle-containing lure radiating reflected light efficiently and having colored light emitting characteristics to draw fishes' attention easily can be provided.

4 Claims, 7 Drawing Sheets

LURE

BACKGROUND OF THE INVENTION

The present invention relates to an artificial bait, generally called a lure for use in fishing. Particularly, it relates to a lure which has a colored light emitting characteristic for efficiently radiating an intensity of reflected light to draw fishes' attention easily which and contains at least one rattle.

Further, the present invention relates to an artificial bait, generally called a lure for use in fishing. Particularly, it relates to a lure which can be joined to a metal connecting member, such as a suspension lug, for connecting with the line without presenting any ill-matched appearance.

A variety of colored light emitting lures have been known such as:

① a type of lure containing a light emitting source therein for illumination;
② a type of lure having a reflective member(s) bonded to the outer surface for reflection of light; and
③ a type of lure having as a structural member thereof a radiant reflective layer which incorporates with a multiplicity of projections.

However, the type ① of a luminous lure equipped with a light emitting source is heavier in weight since the light source and its power supply are installed, thus failing to provide natural movements in water and increasing the overall costs.

The type ② of a lure with a reflective member(s) bonded to the outer surface is likely to get the reflective member(s) damaged or peeled off when directly striking the bottom of a sea or a river. Hence, it is unfavorable for actual use due to poor durability of the reflective member(s).

The type ③ of a lure having as a structural member thereof a radiant reflective layer with a multiplicity of projections, like the type ②, it is likely to get the radiant reflective layer damaged when directly striking the bottom of a sea or a river. Hence, it is also unfavorable for actual use due to poor durability of the radiant reflective layer.

For reducing the drawbacks, a lure is disclosed in Japanese Patent Laid-open Publication (SHO)55-9799, which contains as a structural member thereof a radiant reflective layer having a multiplicity of projections and backed up with a colored member.

However, even in the lure disclosed in Publication (SHO) 55-9799, the colored member equipped behind the radiant reflective layer may absorb incident light and impair the development of color. Hence, the glittering effect for drawing fishes attraction is also impaired.

The present inventor previously introduced a modified lure which contains a radiant reflective layer in the body thereof so as to prevent damages or peeling off of its reflective region and consequently increase the durability in use, as disclosed in Japanese Patent Application (HEI)7-315073. The modified lure however hardly provided rattle (s).

Figure 11:
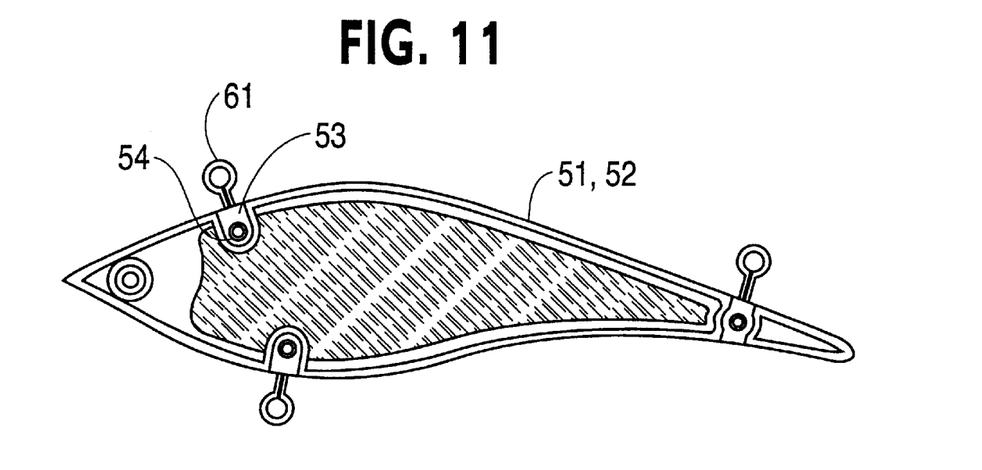
FIG. 11 is a side view showing a conventional lure.
Figure 12:
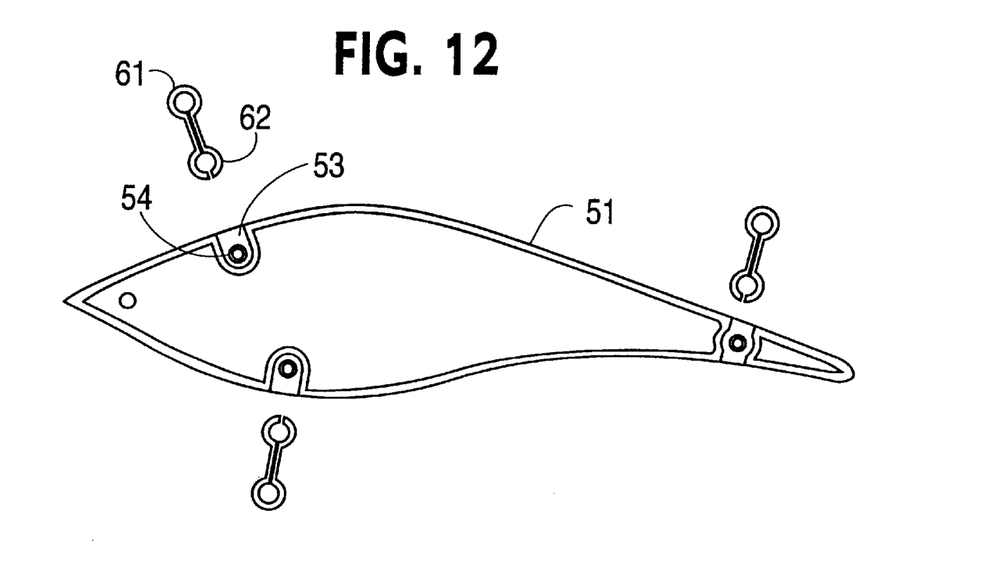
FIG. 12 is an exploded view of a complementary lure member of the same.

The modified lure disclosed in the Application (HEI)7-315073 is formed by pasting together a pair of identical complementary lure members comprising a transparent or translucent material in such a manner that the inner surfaces of the lure members are spaced from each other to form a hollow therebetween. There are metal connecting members provided at the joint portions of the complementary lure members as shown in FIGS. 11 to 13.

More specifically, retainers 53 are formed at appropriate locations of the joint portions of the complementary lure members 51 and 52 to extend substantially at a right angle to towards the hollow space in the lure. The retainer 53 of either complementary lure member has a projection 54 on which an annular leg portion 62 of the metal connecting member 61 is fixed to preliminarily hold the metal connecting member 61. This allows a pair of identical complementary lure members 51 and 52 to be pasted together with much ease.

Figure 13:
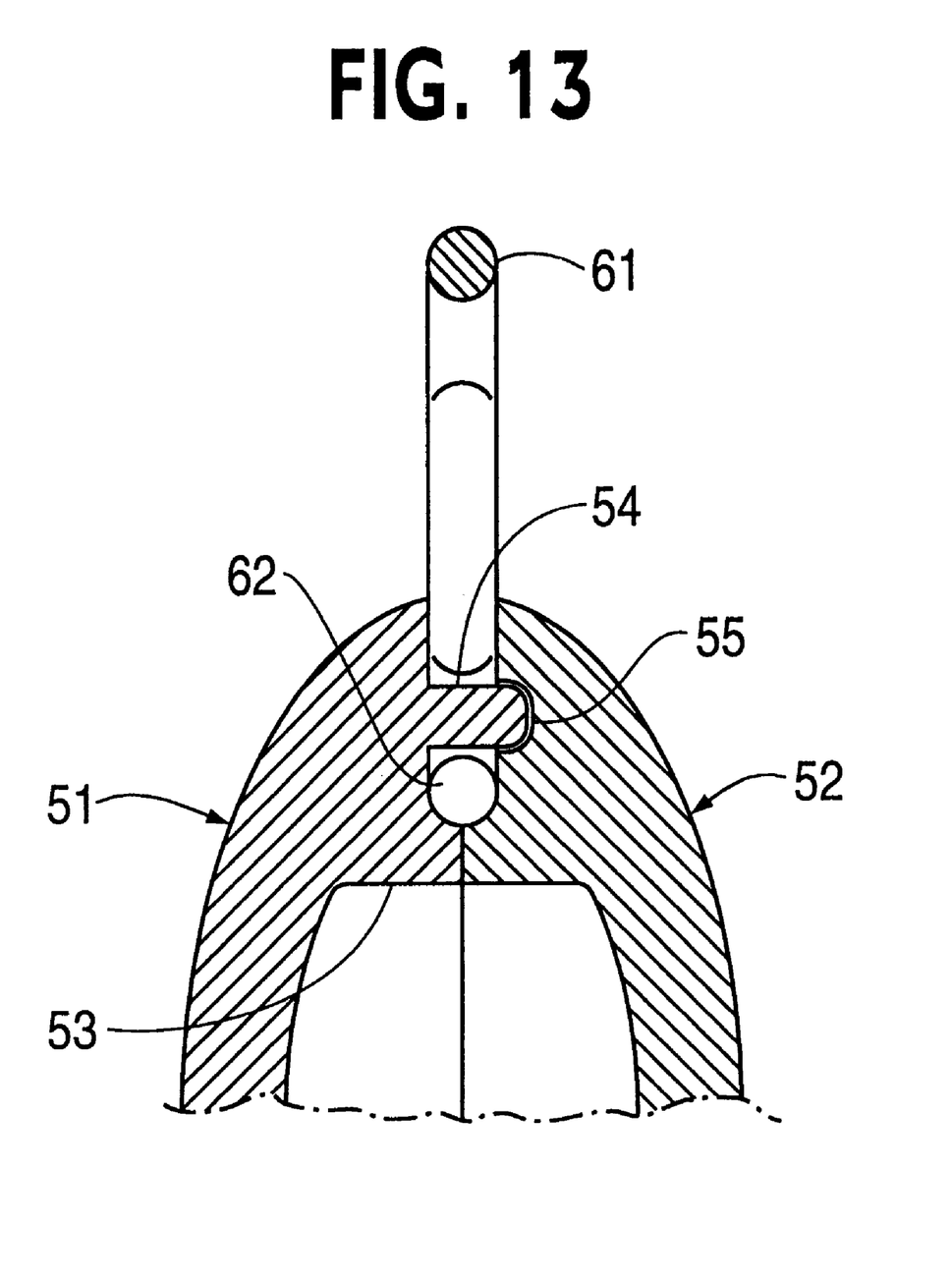
FIG. 13 is a cross sectional view showing a principal part of the same.

The pasted body of a pair of identical complementary lure members 51 and 52 is constructed as shown in FIG. 13 by preliminary fitting the metal connecting member 61 on the projection 54 of either complementary lure member 51 and inserting the projection 54 into a pit 55 of the other complementary lure member 52 which is located and sized for engagement with the projection 54.

The pair of identical complementary lure members 51 and 52 is comprised of a transparent or translucent material. Accordingly, the retainers 53 of the lure extending substantially at a right angle towards the hollow space in the lure can be viewed from the outside thus lowering the quality of the lure as a commercial product.

In particular, the radiant reflective layer which is installed in the lure body has a decreased efficiency of reflection and produces significantly irregular reflections which may result in reduction of the attractiveness of the lure so as to discourage a catch of fish.

It is an object of the present invention to eliminate the foregoing drawbacks of the prior art. An improved lure of the present invention has a rattle booth allocated in the hollow thereof regardless of failing to form the integrated rattle booth inside the hollow space of the lure. The lure also has retainers provided at the joint portions of the complementary lure members without presenting any ill-matched appearance and thus contribute to the increase of the catch of fish.

SUMMARY OF THE INVENTION

A lure according to the present invention is formed by pasting together a pair of identical complementary lure members comprising a transparent or translucent material in such a manner that the inner surfaces of the lure members are spaced from each other to form a hollow therebetween. A rattle booth which is formed separately from the lure members is fixed to the interior of the hollow defined by the complementary lure members and a rattle is housed in this rattle booth.

Moreover, the lure according to the present invention is formed by pasting together a pair of identical complementary lure members comprising a transparent or translucent material in such a manner that the inner surfaces of the lure members are spaced from each other to form a hollow therebetween. The lure includes a radiant reflective layer, which is composed of a multiplicity of projections coated with reflective films for giving luminous effects inside the surface of a pair of identical complementary lure members. In particular, the lure is characterized in that a rattle booth which is formed separately from the lure members is fixed to the interior of the hollow defined by the complementary lure members, and a rattle is housed in this rattle booth.

The lure according to the present invention may further be characterized in that the rattle booth may be fixed to the interior of the hollow defined by the complementary lure by a drop-in technique.

The lure according to the present invention may further be characterized in that the rattle booth may be fixed to the interior of the hollow defined by the complementary lure by a fit-in technique.

The lure according to the present invention may further be characterized in that the rattle booth may be fixed to the interior of the hollow defined by the complementary lure by pasting or fusing technique.

Further, the lure according to the present invention is formed by pasting together a pair of identical complementary lure members comprising a transparent or translucent material. A retainer for metal connecting member which extends in the lengthwise direction of joint portions of the complementary lure members is provided on the same joint portions, and a leg portion of the metal connecting member fixed to the retainer on the complementary lure members is extended in the lengthwise direction of the retainer.

Still further a pair of identical complementary lure members comprising a transparent or translucent material pasted together, and a retainer for a metal connecting member which extends in the lengthwise direction of joint portions of the complementary lure members are provided on the same joint portions. A retaining pit is provided therein in a thicknesswise direction of the lure, with a leg portion of the metal connecting member fixed to the retainer on the complementary lure members extended in the lengthwise direction of the retainer. The leg portion is bent at its distal end at a right angle to be fixed into the corrdsponding retaining pit.

The lure according to the present invention may further be characterized in that the metal connecting member is a suspension lug.

The lure according to the present invention may further be characterized in that the metal connecting member is formed by bending a metal wire.

DETAILED DESCRIPTION OF THE INVENTION

Some embodiments of a lure of the present invention will be described in more detail referring to the accompanying drawings.

Figure 1:
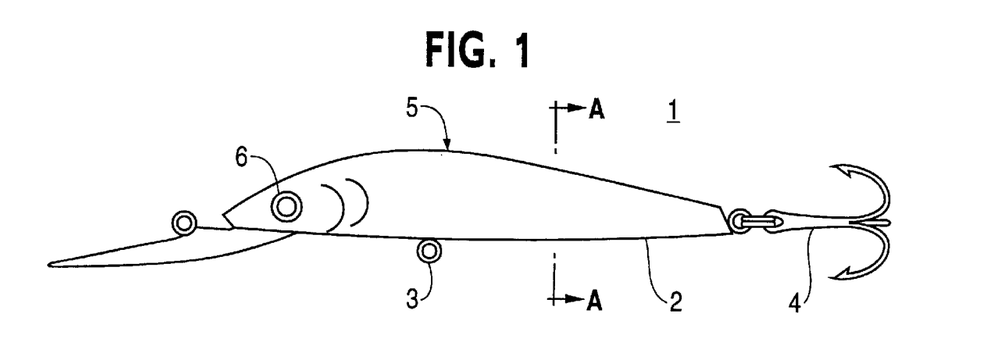
FIG. 1 is a side view showing an embodiment of a lure of the present invention.

Referring to FIG. 1, the object denoted by reference numeral 1 is a lure according to the present invention. The lure 1 comprises a lure body 2, a suspension lug 3 provided at the head of the lure body 2, and a fishhook 4 provided at the tail of the same. There are also provided a preferably transparent or translucent color coated layer 5 on the lure body 2 and a fisheye 6.

Figure 2:
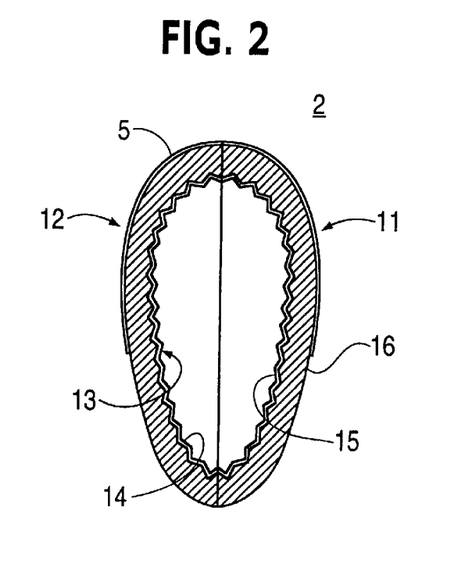
FIG. 2 is an enlarged cross sectional view taken along the line A—A.

FIG. 2 is an enlarged cross sectional view taken along the line A—A of FIG. 1. As shown, the lure body 2 is formed by pasting together a pair of identical complementary lure members 11 and 12 comprising a transparent or translucent material in such a manner that the inner surfaces of the lure members are spaced from each other to form a hollow therebetween. The transparent or translucent material may preferably be a plastic such as ionomer resin which has higher impact resistance and toughness properties, or it may be reinforced glass.

Figure 3:
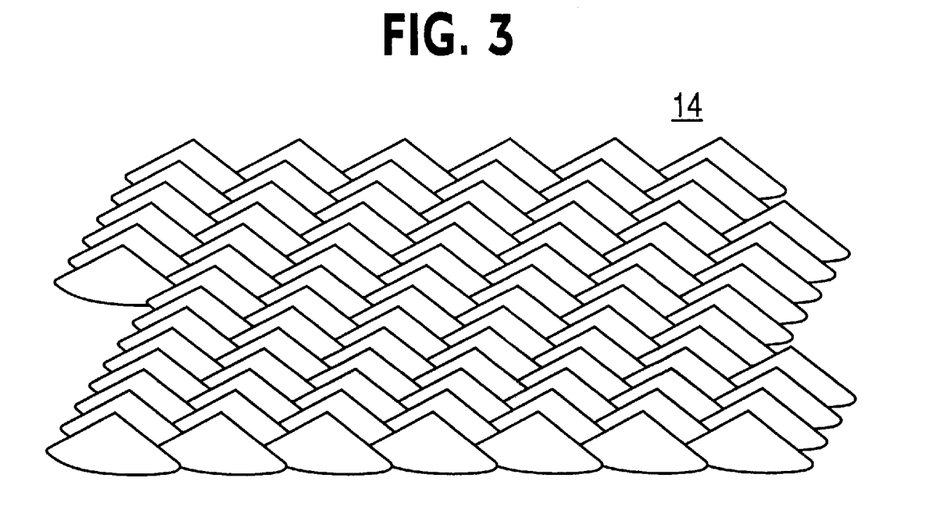
FIG. 3 is an enlarged perspective view of a radiant reflective layer.

Each of the pair of identical complementary lure members 11 and 12 has a radiant reflective layer 13 provided on the inner wall thereof comprising a multiplicity of projections 14. The projections 14 are of a conical shape as best shown in FIG. 3. The conical shape produces a higher dispersion of reflected light while producing considerable area for the reflective surface, hence permitting the radiant reflective layer 13 to provide a satisfactory level of reflection. It would be understood that the shape of the projections 14 is not limited to a conical shape, and any applicable shape suited for providing the reflecting effect of the radiant reflective layer 13 can be used.

The radiant reflective layer 13 has its surface covered with a reflective film 15 made of a vapor deposited film, a light reflective painted film, etc. The reflective film 15 reflects incident light passing through the radiant reflective layer 13 and radiates reflected light to the outside of the lure body 2 so as to simulate light reflected on scales. The use of the reflective film 15 prevents loss of the incident light and increases the physical strength of the pair of identical complementary lure members 11 and 12.

Each of the pair of identical complementary lure members 11 and 12 has a smooth layer 16 provided on the outer walls thereof. The smooth layer 16 functions to eliminate the sound which is generated when the lure body 2 swims fist and to protect the lure body 2 from getting damaged when striking the bottom of a sea or a river which reduces the durability of the radiant reflective layer 13.

The smooth layers 16 of a pair of identical complementary lure members 11 and 12 are also covered at their uppermost portions or their lowermost portions with transparent or translucent colored coatings 5. The colored coating 5 may consistently be implemented by an integral forming technique such as press bonding, hot stamping, or adhesive bonding of a colored sheet or printing, painting, or vacuum forming of a pattern in order to simulate a fish having a combination of the dark back and the white belly. Preferably, the colored coating 5 is transparent or translucent for allowing the transmission of light to demonstrate the feature of the lure 1 of the present invention.

The fabrication of the lure 1 of the present invention starts with forming the reflective film 15 over the surfaces of the radiant reflective layers 13 having a multiplicity of the projections 14. The reflective film 15 is formed over each of the pair of identical complementary lure members 11 and 12 which has been formed to a desired shape so as to have the projections 14. The reflective film 15 may be implemented by developing a vapor deposited film and applying a reflective paint over the film as well as by an integral forming technique such as press bonding, hot stamping, or adhesive bonding of a reflective sheet or printing, painting, or vacuum forming of a pattern. Then, the pair of identical complementary lure members 11 and 12 are pasted together by heat fusing or by application of an adhesive to complete the lure body 2.

This is followed by coating and decorating the lure body 2 with the colored layer 5 and the fisheye 6 using the integral forming technique such as adhesion, painting, or vacuum forming. After the suspension lug 3 and the fishhook 4 are respectively joined to the head and the tail of the lure body 2, the lure 1 is completed as a commercial product.

Figure 4:
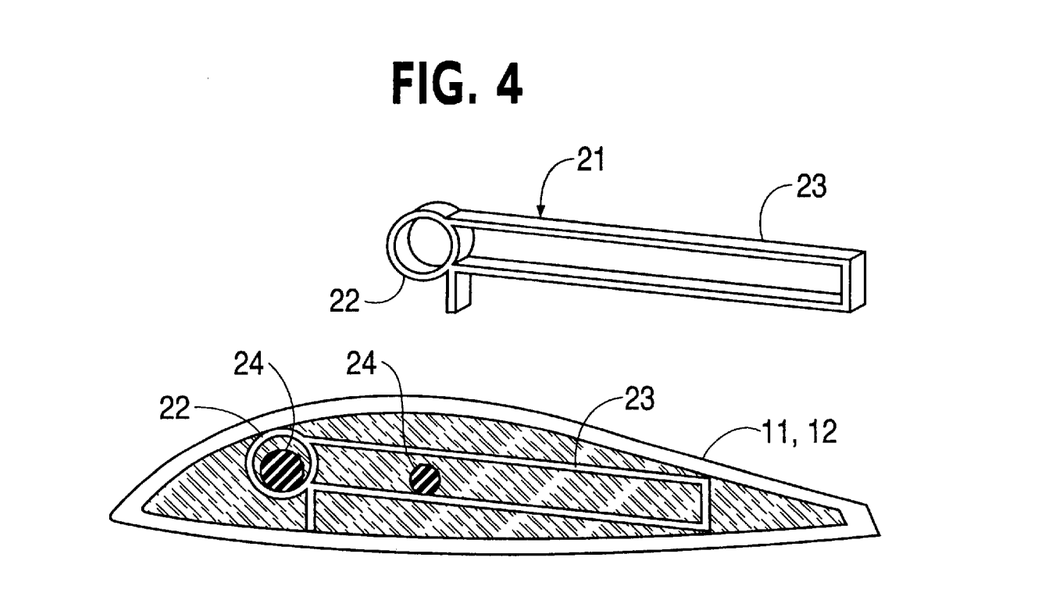
FIG. 4 is a side view of a complementary lure member showing another embodiment of the lure of the present invention.

As shown in FIG. 4, a rattle booth 21 which is separately formed may be fixed by a drop-in technique to the interior of the follow defined by the complementary lure members 11 and 12. The rattle booth 21 holds therein rattles 24 which are made of metal balls such as lead balls and which are arranged so as to be movable. The rattle booth 21 comprises a circular first booth 22 at the front and a second booth 23 at the rear which extends in a lengthwise direction of the lure body 2 and tilts downwardly. The rattle booth 21 and the rattles 24 are not limited to the shape and the number determined in the description but any other shape and number determined may be used when the weighting balance and the generation of attractive sounds are well expected with equal success.

Figure 5:
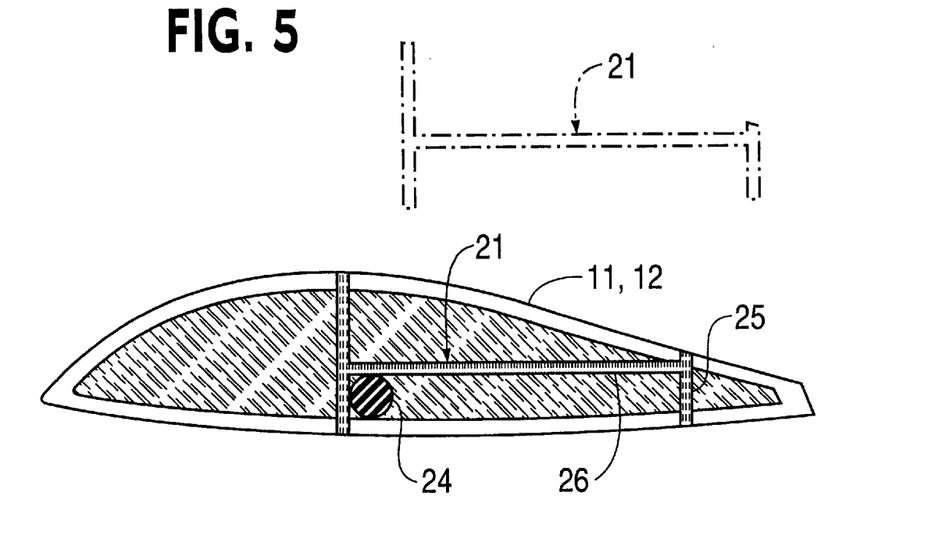
FIG. 5 is side view of a complementary lure member showing a further embodiment of the lure of the present invention.

Another embodiment of the lure of the present invention is illustrated in FIG. 5 where a rattle booth 21 separately formed from the lure body 2 is fixed by a fit-in technique to the interior of the hollow defined by the complementary lure members 11 and 12, and 24 denotes a rattle. More specifically, the pair of identical complementary lure members 11 and 12 have notches 25 of a predetermined width provided therein at corresponding locations. A partition strip 26, separately formed from the lure body to form the rattle booth 21, is fitted into the notches 25, so that the rattle booth 21 is securely fixed to the interior of the hollow defined by the complementary lure members 11 and 12.

Figure 6:
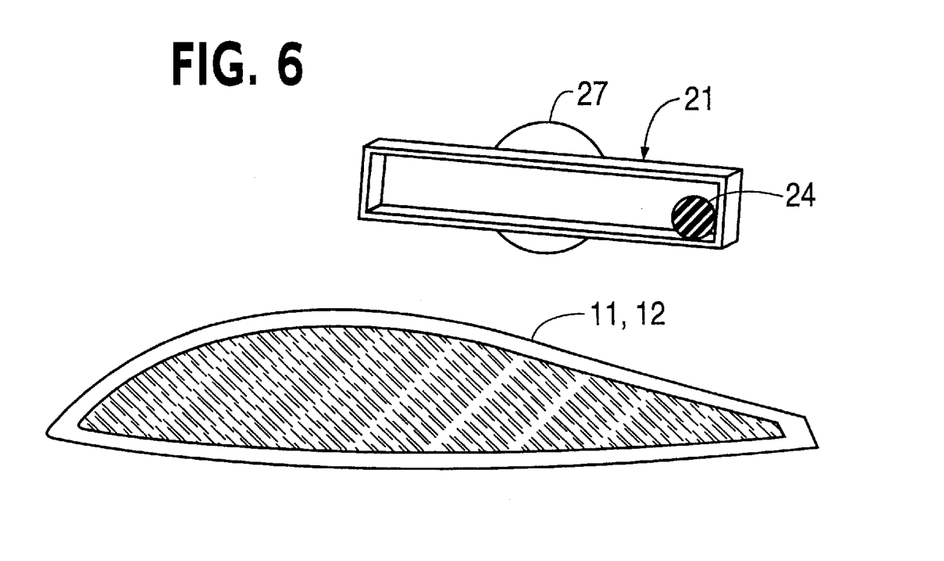
FIG. 6 is side view of a complementary luxe member showing a still further embodiment of the lure of the present invention.

A further embodiment of the lure of the present invention is shown in FIG. 6 where a rattle booth 21 separately formed from the lure body 2 is fixed by adhesive to the interior of the hollow defined by the complementary lure 11 and 12, and 24 denotes a rattle. More particularly, the rattle booth 21 has a substantially circular bonding tab 27 provided on the back thereof. With its bonding tab 27 bonded to the inner sides of a pair of identical complementary lure members 11 and 12, the rattle booth 21 is securely fixed to the interior of the hollow defined by the complementary lure members 11 and 12.

Figure 7:
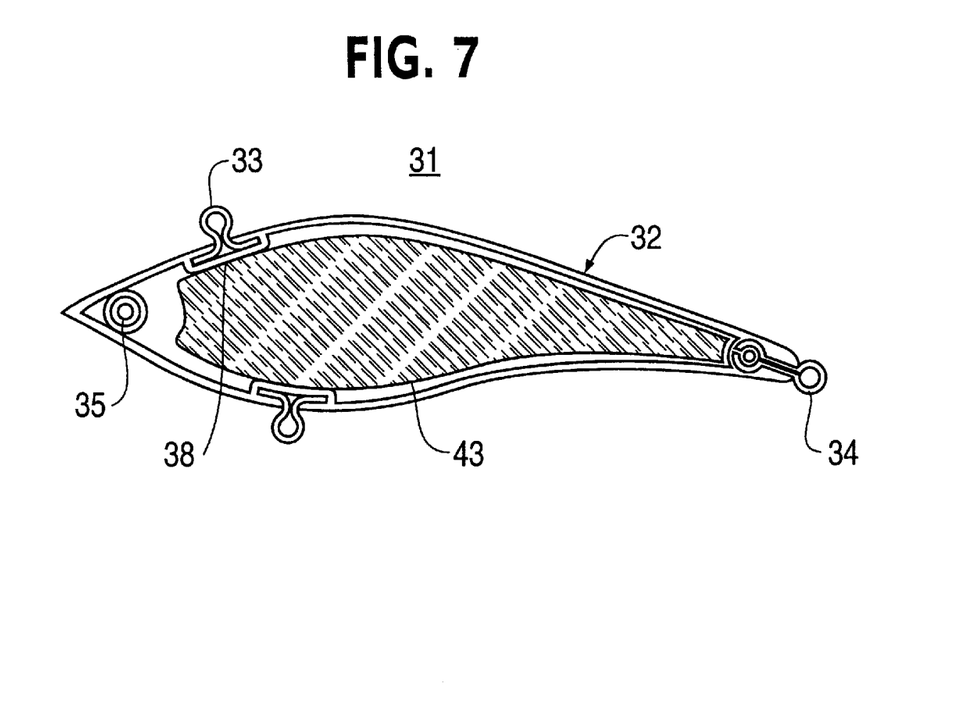
FIG. 7 is a side view of a further embodiment of the lure of the present invention.
Figure 8:
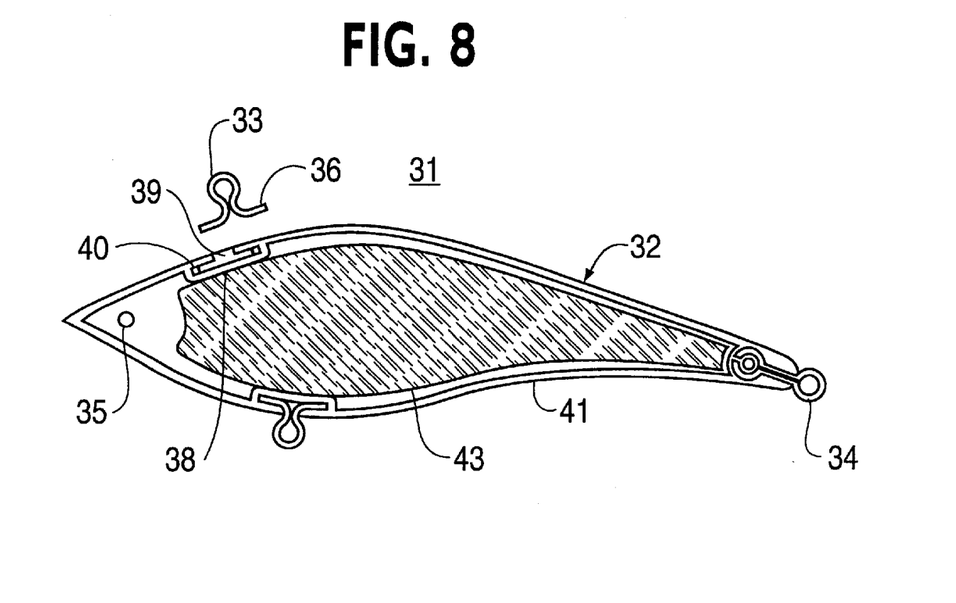
FIG. 8 is an exploded view of a complementary lure member.

A still further embodiment of the present invention is shown in FIGS. 7 and 8 explaining a lure 31. The lure 31 comprises a lure body 32, metal connecting members including a suspension lug 33 provided at the head of the lure body 32, and a fishhook 34 provided at the tail. There are also provided a fisheye 35 and a radiant reflective layer 43 formed on each side of the lure body 32.

As shown, the lure body 32 is formed by pasting together a pair of identical complementary lure members 41 and 42 comprising a transparent or translucent material in such a manner that the inner surfaces of the lure members are spaced from each other so as to form a hollow therebetween. The transparent or translucent material may be a plastic such as ionomer resin which has higher impact resistance and toughness properties, or it may be a reinforced glass.

Figure 9:
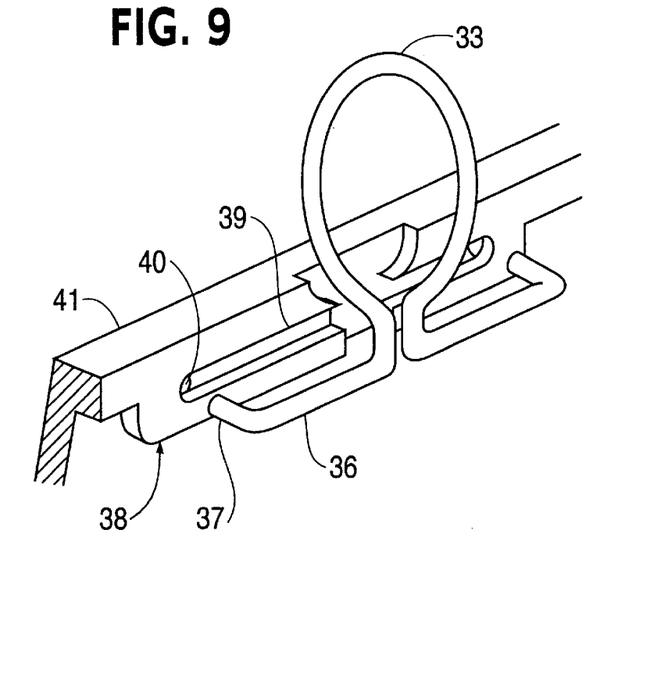
FIG. 9 is an enlarged perspective view of a metal link.

FIG. 9 illustrates an example of the suspension lug 33. The suspension lug 33 is made by forcing a metal wire into a ring-like shape and bending its ends in opposite directions to form leg portions 36. Each leg portion 36 is further bent at a right angle in both the lengthwise and thicknesswise directions to form a holding hook 37.

Referring to FIGS. 8 and 9, retainer 38 for retaining the suspension lug 33 is provided at the joint portion of the pair of identical complementary lure members 41 and 42 comprising the transparent or translucent material so as to extend in the lengthwise direction of the lure body 32. Provided in the retainer 38 of the complementary lure member 41 are grooves 39 for accepting the leg portions 36 of the suspension leg 33, and retaining pits 40 at an end of each of the grooves 39 for accepting the holding hooks 37 of the suspension lug 33.

Figure 10:
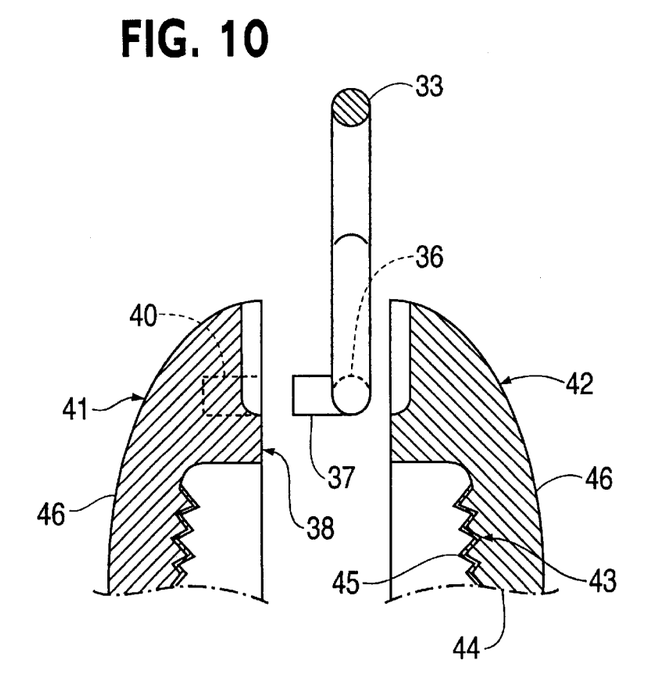
FIG. 10 is an enlarged cross sectional view of a joint portion.

For assembling a pair of identical complementary lure members 41 and 42, the leg portions 36 of each suspension lug 33 are preliminarily held in the grooves 39 of the corresponding retainer 38 of the complementary lure member 41 with the holding hooks 37 inserted into the retaining pits 40, as shown in FIG. 10. Then, the complementary lure member 42 is joined to the other complementary lure member 41 so that the suspension lug 33 is securely fixed to the pair of identical complementary lure members 41 and 42.

As shown in FIG. 10, a reflective layer 45, e.g., a vapor deposited film or a reflective painted film, is coated over projections 44 of a radiant reflective layer 43. The reflective layer 45 reflects incident light received through the radiant reflective layer 43 and radiates reflected light to the outside of the lure body 32. The use of the reflective layers 45 can prevent loss of the incident light and increase the physical strength of a pair of identical complementary lure members 41 and 42.

A smooth layer 46 having no projections is provided on the outer side of a pair of identical complementary lure members 41 and 42. The smooth layer 46 functions to eliminate the sound generated when the lure body 32 swims fast and to protect the lure body 43 from getting damaged at the outer surface when striking the bottom of a sea or a river. Hence, there is no declination in the durability of the radiant reflective layer 43.

A pair of identical complementary lure members 41 and 42 may be protected with transparent or translucent colored layers which are located either over or under the smooth layer 46. The colored layers are consistently implemented by an integral forming technique such as press bonding, hot stamping, or adhesive bonding of a color sheet or printing, painting, or vacuum forming of a pattern in order to simulate a fish having the dark back and the white belly. The colored layers are preferably transparent or translucent for allowing the transmission of light to demonstrate the feature of the lure 31 of the embodiment, or no sufficient effect of the lure 31 could be expected.

In fabricating the lure 31 of the embodiment, the radiant reflective layers 43 of the pair of identical complementary lure members 41 and 42 having a desired shape with the projections 44 are coated at the surface with a reflective film 45. The reflective film 45 maybe implemented not only by press bonding, hot stamping, or adhesive bonding of a reflective sheet, or an integral forming such as printing, painting, or vacuum forming of a pattern but also by vapor deposition or application of reflective paint. Then, a pair of identical complementary lure members 41 and 42 are pasted together with the suspension lug 33 fixed therebetween and bonded by heat fusing or adhesive bonding to complete the lure body 32.

APPLICABILITY FOR INDUSTRIAL USE

The lure of the present invention having the foregoing construction permits its rattle booth arrangement to be replaced with another while a pair of identical complementary lure members of the lure body remain unchanged to carry out the weight adjustment. Accordingly, the weight adjustment can arbitrarily be executed after the lure body is completed.

Also, the lure of the present invention is simple in the construction thus lowering its overall production cost, and simultaneously has improved durability and efficiency of light reflection.

Moreover, the lure of the present invention hardly allows its radiant reflective layers to be damaged when hitting against the bottom of a sea or a river while it appears glittering to more effectively draw fishes' attention.

As set forth above, the lure of the present invention has retainers for the metal connecting member of a pair of identical complementary lure members extended in the lengthwise direction of joint portions of the complementary lure members. Hence, the natural appearance is simulated and the catch of fish is increased.

Also, the lure of the present invention is simple in the construction, thus lowering its overall production cost and simultaneously having improved durability and efficiency of light reflection.

In the lure of the present invention, the leg portions of the metal connecting members are bent at the distal end at a right angle so as to be securely fixed to the retainer on the complementary lure members. Since the metal connecting members rarely fall off, the lure can be much improved in durability.

What is claimed is:

1. A lure comprising:

a pair of complementary lure members formed of a transparent or translucent material and having a pair of inner surfaces, said pair of lure members including notches and being fastened together such that said pair of inner surfaces are spaced apart so as to form a hollow therebetween;

a radiant reflective layer formed on each of said pair of inner surfaces and including a plurality of projections, a reflective film having colored light emitting characteristics being coated on a surface of said reflective layer; and a rattle booth including a partition strip, said rattle booth being formed separately from said pair of lure members and fixed within said hollow by fitting said partition strip into said notches, said rattle booth housing a rattle.

2. The lure of claim 1, wherein said rattle booth includes a first booth and a second booth, each of said first booth and said second booth housing a rattle comprising a metal ball, said rattle booth being shaped so as to contact said inner surface forming said hollow such that said rattle is held in a fixed position.

3. The lure of claim 1, wherein said rattle booth is bonded to said inner surfaces forming said hollow.

4. The lure of claim 1, wherein said rattle booth is fused to said inner surfaces forming said hollow.

* * * * *